United States Patent
Schlinger

(10) Patent No.: US 7,453,348 B1
(45) Date of Patent: Nov. 18, 2008

(54) METHOD AND SYSTEM FOR DISTRIBUTING MANAGEMENT INFORMATION OVER POWER NETWORKS

(75) Inventor: Bryan Schlinger, Georgetown, TX (US)

(73) Assignee: Crossroads Systems, Inc., Austin, TX (US)

( * ) Notice: Subject to any disclaimer, the term of this patent is extended or adjusted under 35 U.S.C. 154(b) by 0 days.

(21) Appl. No.: 11/820,265

(22) Filed: Jun. 18, 2007

Related U.S. Application Data

(63) Continuation of application No. 11/043,327, filed on Jan. 26, 2005, now Pat. No. 7,327,223.

(51) Int. Cl.
*G05B 11/01* (2006.01)

(52) U.S. Cl. .............................. 340/310.11; 340/310.12

(58) Field of Classification Search .................. None
See application file for complete search history.

(56) References Cited

U.S. PATENT DOCUMENTS 6,396,392 B1 5/2002 Abraham
6,480,510 B1 * 11/2002 Binder ....................... 370/502
6,480,540 B1 11/2002 Guillotel

* cited by examiner

*Primary Examiner*—Julie Lieu
(74) *Attorney, Agent, or Firm*—Sprinkle IP Law Group

(57) ABSTRACT

Systems and methods for distributing management information in a computing system over existing power are disclosed. Embodiments of these systems and methods may eliminate the need for a separate physical network to distribute management information in the computer system and the commensurate physical hardware need to implement these networks. More particularly, embodiments may provide a management system which may place a management communication on a physical transport medium. This management communication may then be placed on the power lines used to power the various components of the computing system and distributed to the various components along these power lines, where it may be received by its intended recipient and acted upon if necessary.

25 Claims, 6 Drawing Sheets

METHOD AND SYSTEM FOR DISTRIBUTING MANAGEMENT INFORMATION OVER POWER NETWORKS

RELATED APPLICATIONS

This application is a continuation of, and claims benefit of priority under 35 U.S.C. §120 the filing date of U.S. patent application Ser. No. 11/043,327 by inventor Bryan Schlinger, entitled "Method and System for Distributing Management Information over Power Networks" filed on Jan. 26, 2005 now U.S. Pat. No. 7,327,223, the entire contents of which are hereby expressly incorporated by reference for all purposes.

TECHNICAL FIELD OF THE INVENTION

The invention relates in general to methods and systems for distributing management information in a computing system, and more particularly, to distributing this management information over existing power lines.

BACKGROUND OF THE INVENTION

Devices in a computing system (e.g., personal computer, laptop, cell phone, controller, server, storage router or other computing system known in the art) usually must communicate with one another to effectuate the end for which they are designed. Communications between elements in a computing system can generally be grouped under one of two rubrics, either the communications is a data communication or a management communication.

In some cases, the same transport medium and protocol may be utilized to deliver both management and data information. As traffic increases, however, this may have a noticeably adverse impact on the functionality of the system. Because both management and data information utilize the same transport medium, at some point management traffic must be sorted from data traffic. This places an additional processing overhead on what is typically an already heavily burdened system.

To combat these problems, an out-of-band management solution may be implemented in the computing system. This computing system may handle data traffic in one protocol transported over one type of physical medium, while management traffic is communicated between elements of the computing system in another protocol on a distinct physical medium.

FIG. 1 depicts one example of such a solution implemented for a series of managed routers in the setting of a storage network. Routers 120, 122, 124 may be a series of storage routers designed to implement an integrated storage solution. Each router may have interfaces capable of receiving data and routing that data to another location. To manage the integrated storage solution, management software may be executing on a separate computer system 130. This management software may perform administrative tasks associated with the storage network, or implement logic associated with the storage network, such as mapping information for the routing of incoming data communications.

Management information may be communicated from the management computer system 130 to one or more of the routers 120, 122, 124 through a switch or hub. In one embodiment, routers 120, 122, 124 are configured to route fiber channel communications to SCSI devices while the management communications may be communicated from management computer system 130 to routers 120, 122, 124 using the Ethernet transport medium, and various communication protocols, such as TCP/IP.

As is known in the art, to communicate management information to routers 120, 122, 124, management computer system 130 sends the communication to Ethernet switch 110. Ethernet switch 110 may then forward the incoming communication to the proper router(s) 120, 122, 124. Consequently, to facilitate these management communications, Ethernet switch 110 must be directly coupled to each of routers 120, 122, 124. If there are n routers in a storage network, this requires at least n+1 cables, one cable from management system 130 to switch 110, and one cable from switch 110 to each of the routers 120, 122, 124. Furthermore, power must be supplied to each of switch 110 and routers 120, 122, 124. This results in an additional n+1 cables, one cable from power supply 140 to switch 110, and one cable from power supply 140 to each of routers 120, 122, 124. Thus, for any given set of n routers 120, 122, 124 in a storage network, at least 2n+2 cables are required to deliver power and management information to these router 120, 122, 124, not to mention the cables required for the actual implementation of the data traffic routing.

This plethora of cables brings up a whole host of difficulties. First of all, the number of cables may present reliability issues. Besides the cabling required for data traffic, each router 120, 122, 124 now has two additional points of failure, the management interface from switch 110, and the power cable from power supply 140.

Part and parcel with this, the number of cables required to set up routers 120, 122, 124 and switch 110 may entail a time consuming and complicated initial setup, resulting in a nest of wires. Diagnosing a future physical problem within this nest of wires may be a virtual impossibility, as the various connections and uses of each of these cables may be difficult to discern at a later time.

Furthermore, this solution to managing components may reduce the efficiency and efficacy of the set of components. For example, routers 120, 122, 124 which exist in a storage network are usually contained in what is termed a "rack", which is a storage location having a number of slots for the placement of routers 120, 122, 124. However, in the arrangement depicted in FIG. 1, one slot of the rack which contains routers 120, 122, 124 would usually contain switch 110 as well. The physical space requirements of switch 110 typically mean that one less router 120, 122, 124 can be placed in a rack, resulting in a larger more ungainly system while simultaneously reducing the efficiency and power of that system.

Thus, a need exists for a method and system for distributing management information in a computer system which utilizes existing physical connections, including power connections.

SUMMARY OF THE INVENTION

Systems and methods for distributing management information in a computing system over existing power are disclosed. These systems and methods may eliminate the need for a separate physical network to distribute management information in the computer system and the commensurate physical hardware need to implement these networks. A management system may place a management communication on a physical transport medium. This management communication may then be placed on the power lines used to power the various components of the computing system and distributed to the various components along these power lines, where it may be received by its intended recipient and acted upon if necessary.

In one embodiment, a management communication is placed on a power line in the system and received at a router which receives power from the power line.

In another embodiment, the management communication is received by a router on an out-of-band transport medium and placed on the power line.

In yet another embodiment, the management communication is modulated onto the power line by the router.

In other embodiment, the management communication may be placed on a power backplane to which the router is coupled.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
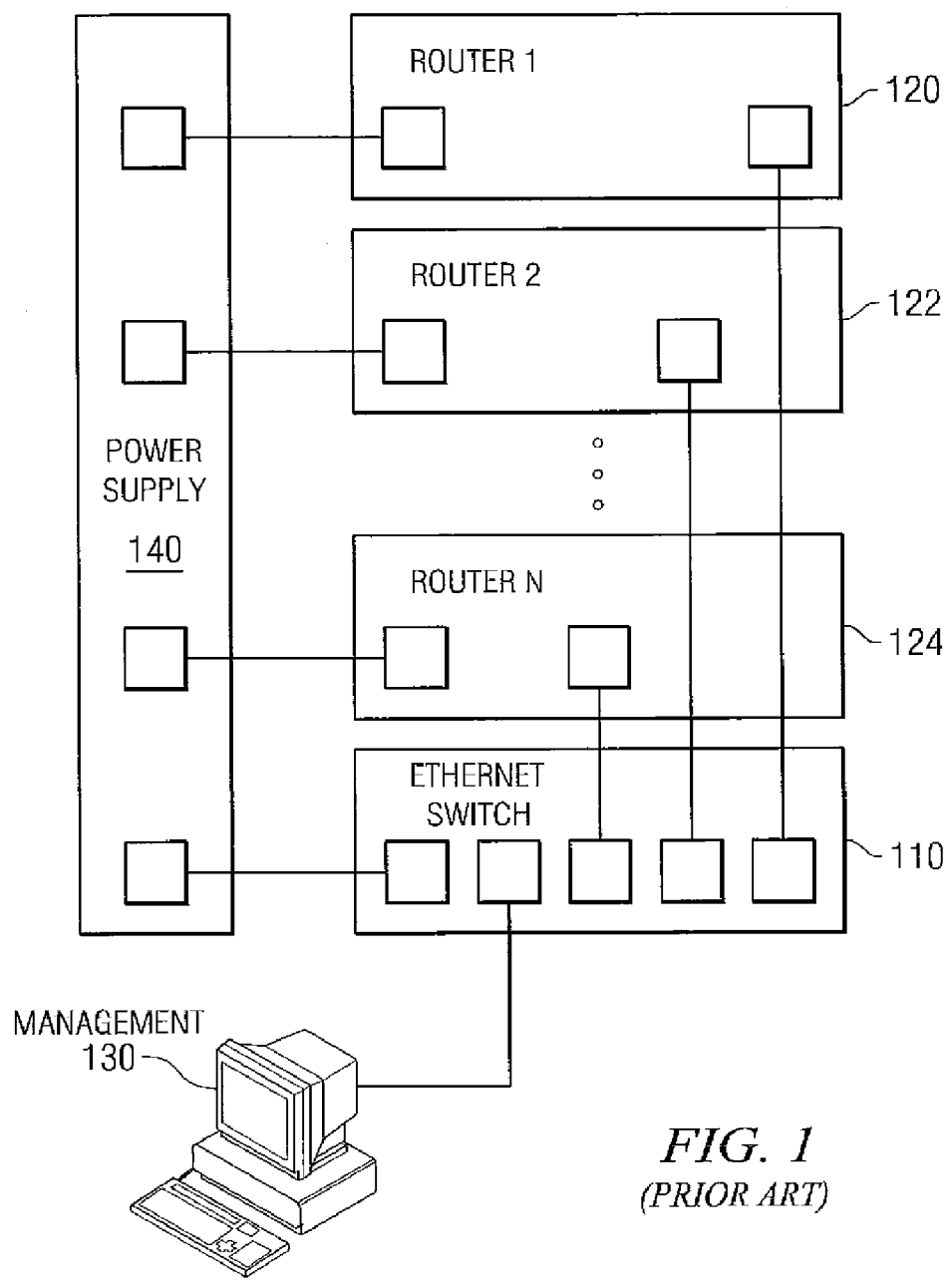
FIG. 1 depicts a block diagram of one embodiment of components of a storage system.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements).

A few terms are defined or clarified to aid in an understanding of the terms as used throughout the specification. The term "out-of-band" utilized with respect to a management communication and a router is intended to mean that the management communication is in a format different from the format used by the router to transport non-management data, or that the management communication is transported over a different medium than the transport medium used by the router to transport non-management data.

The term "power line" is intended to mean any power transport media. Additionally, the term "power line" may refer to a plurality of individual connections within a system. Thus, two or more power lines within a system may be referred to collectively as the power line of the system.

The term "management communication" is intended to mean all data that is transmitted to, and received from, a router during any sort of management process. This data may be utilized by the router for configuration purposes. For example, IP addresses, disk mapping information, DHCP configuration, etc.

Attention is now directed to systems and methods for distributing management information in a computing system over the existing power media used in the system. These systems and methods may eliminate the need for a separate physical network to distribute management information in the computer system and the commensurate physical hardware need to implement these networks. A management system may place a management communication on a physical transport medium. This management communication may then be placed on the power lines used to power the various components of the computing system and distributed to the various components along these power lines, where it may be received by its intended recipient and acted upon if necessary. These systems and methods may decrease the number of physical connections required to implement and extend a management network, while still allowing the distribution of out-of-band management information to components of a computing system. Conversely, a component may place a management communication on the power lines for eventual delivery to the management system.

Figure 2:
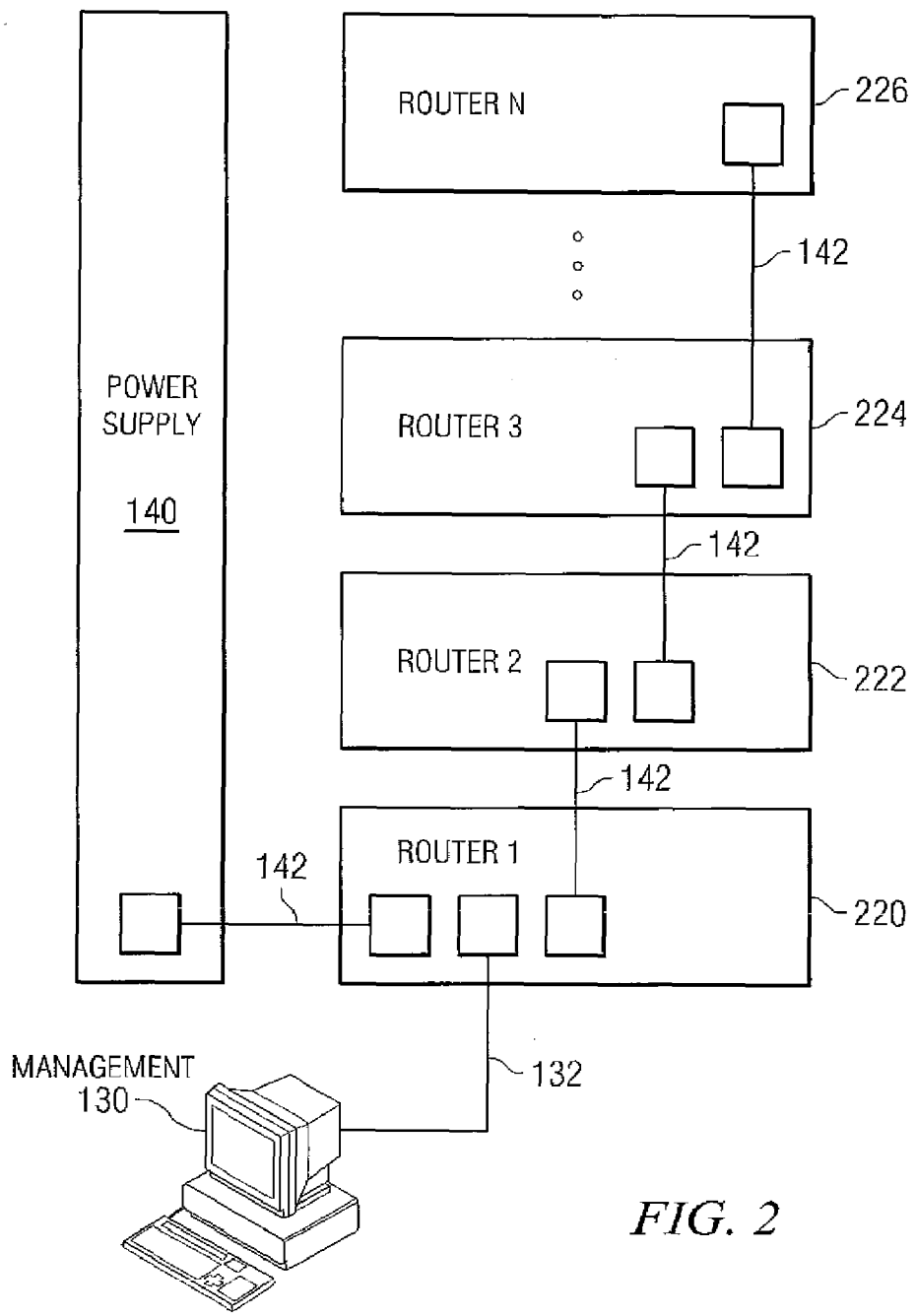
FIG. 2 depicts a block diagram of another embodiment of components a storage system.

Turning now to FIG. 2, one embodiment of a system for distributing management information over the existing power media in a storage system is depicted. Similarly to FIG. 1, routers 220, 222, 224, 226 may be a series of storage routers designed to implement an integrated storage solution. Routing devices 220, 222, 224, 226 can include any type of network device known in the art, including storage routers, switches, bridges, gateways or other device capable of routing data. Exemplary embodiments of routing devices include the Crossroads 6,000 and 10,000 Storage Routers by Crossroads Systems, Inc., of Austin Tex. However, embodiments may be utilized on other devices which transport data and are managed using management communications.

Each router 220, 222, 224, 226 may have interfaces capable of receiving data and routing that data to another location (not shown). These input and output mediums for receiving and routing data can operate according to any data transport protocol, including SCSI, Fiber Channel, advanced technology attachment ("ATA"), serial ATA ("SATA"), iSCSI, infiniband, parallel SCSI, serial attached SCSI or other data transport protocol known in the art.

To manage routers 220, 222, 224, 226 in the storage system, management software may be executing on a separate computer system 130. This management software may perform administrative tasks associated with the storage network, or implement logic associated with the storage network, such as mapping information for the routing of incoming data communications.

Management software manages routers 220, 222, 224, 226 by sending a management communication to one or more of routers 220, 222, 224, 226. In one particular embodiment, this management communication may be an out-of-band management communication. For example, each of the routers may have a fiber channel data transport medium and a SCSI transport medium for receiving, routing and outputting data. Management system 130 may send a management communication to router 220 on Ethernet cable 132 in a variety of different protocols. Router 220 receives the management communication on Ethernet cable 132 at an ethernet port. Router 220 then makes a determination whether this management communication is intended for itself using hardware and/or software methodology as is know in the art.

In one embodiment, each router 220, 222, 224, 226 is assigned a software identification. The software identification of the intended recipient of a management communication from management system 130 is packaged with the management communication. When router 220 receives this message it analyzes the identification of the intended recipient of the management communication. If the management communication is intended for router 220, router 220 may evaluate the management communication and respond to the management communication accordingly. If, however, the communication is not intended for router 220, router 220 may place this communication on power line 142 for other routers 222, 224, 226.

In an alternative embodiment, management software may be executing on one or more of the routers or other devices in the storage. For example, if management software is executing on router 220, router 220 may evaluate a management communication generated by the management software executing on router 220 and respond to the management communication accordingly if it is intended for router 220. If, however, the communication is not intended for router 220, router 220 may place this communication on power line 142 for other routers 222, 224, 226.

Conversely, router 220 may receive a management communication from another router 222, 224, 226 on power line 142. Router 220 makes a determination whether this management communication is intended for itself using hardware or software methodology as is know in the art. If the received management communication is not intended for router 220, router 220 may deliver this management communication to management system 130 on Ethernet cable 132, or, in an alternative embodiment to management software executing on router 220.

Figure 3:
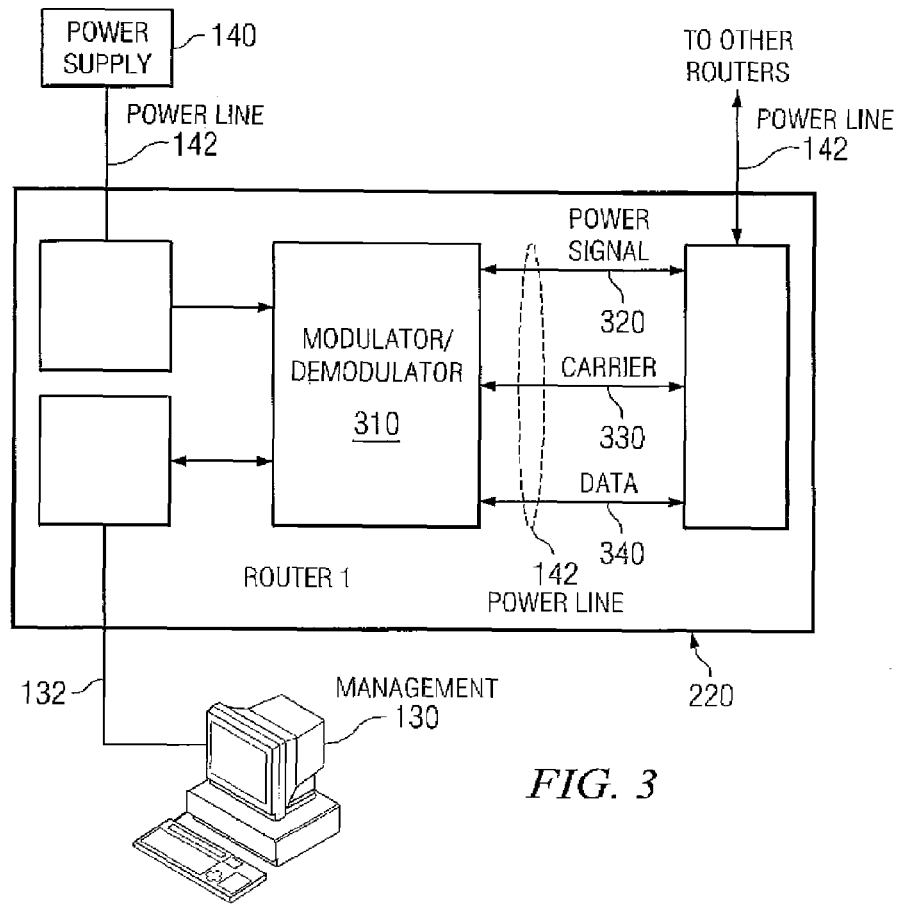
FIG. 3 depicts a block diagram of one embodiment of a router which may be used with the components depicted in FIG. 2.

Turning to FIG. 3, a more detailed block diagram of router 220 is depicted. As discussed above, at some point during operation of the storage system, router 220 may receive a management communication from management system 130. If router 220 determines that the management communication is not intended for router 220, it may place the management communication on power line 142 for reception by other routers 222, 224, 226.

In one particular embodiment, modular/demodulator 310 of router 220 receives management communications from management system 130 and modulates management communication onto power line 142 using a carrier frequency 330 and power signal 320 on power line 142. One of skill in the art will appreciate the various other ways in which a management communication from management system 130 may be placed on power line 142 by router 220. For example: router 220 may receive a communication from management system 130 on an ethernet cable 132. Using Orthogonal Frequency Division Multiplexing (OFDM) across a band from 4.3 MHz to 20.9 MH such as the methodology described in the HomePlug AV Specification by the HomePlug Powerline Alliance, router 220 may place this communication on power line 142. Other approaches, such as those laid out in the HomePlug 1.0 specification, or the X10 specification may also be utilized for placing a management message from management system 130 onto power line 142.

Figure 4:
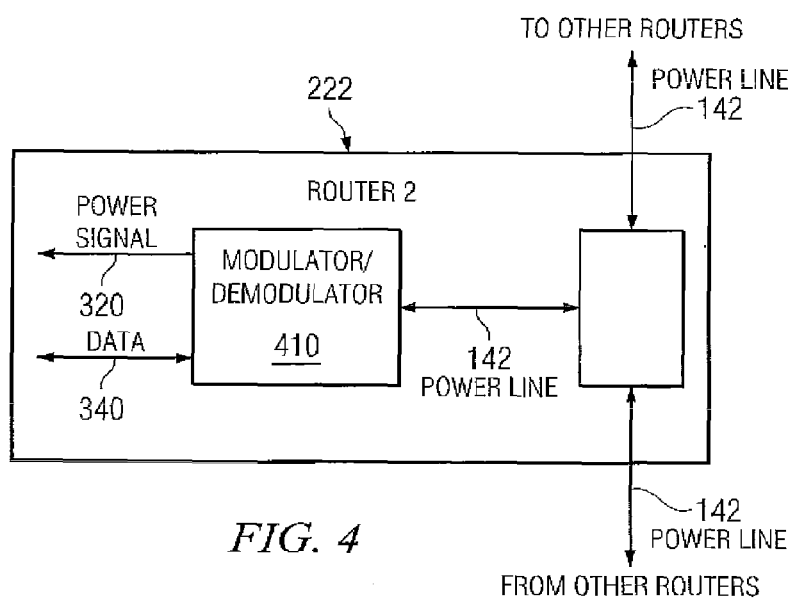
FIG. 4 depicts a block diagram of another embodiment of a router which may be used with the components depicted in FIG. 2.

Once management communication has been placed on power line 142 it may be received by other routers 222, 224, 226. FIG. 4 depicts a more detailed block diagram of one of these other routers 222, 224, 226. Though router 222 is pictured, this block diagram may represent any of routers 222, 224, 226 connected to router 220 by power line 142.

Router 222 receives power from power line 142. Additionally, modulator/demodulator 410 in router 222 may demodulate the signal received on power line 142 according to the methodology utilized to place a management communication on the line, as described above. This may produce a management communication placed on power line 142 by router 220. Router 222 then analyzes the identification of the intended recipient of the management communication. If the management communication is intended for router 222, router 222 may evaluate the management communication and respond to the management communication accordingly. If, however, the communication is not intended for router 222, router 222 may ignore or discard the management communication. Routers 224 and 226, also coupled to power line 142, function in substantially the same manner as router 222 described above.

By the same token, router 222 may wish to send a management communication to management system 130. To accomplish this, the management communication may be sent to modulator/demodulator 410 of router 222. Modulator/demodulator 410 then modulates the management communication onto power line 142, as described above with respect to FIG. 3, for eventual reception at router 220.

Returning now to FIG. 3, router 220 may receive this management communication from router 222 on power line 142. Modulator/demodulator 310 in router 220 may demodulate the signal received on power line 142 according to the methodology described above, to produce the original management communication sent by router 222. This management communication can then be delivered to management system 130 over ethernet cable 132.

In the embodiment just described, router 220 may perform functionality not required by other routers 222, 224, 226. Specifically, router 220 may have a physical port for receiving a connection from management system 130. As routers 220, 222, 224, 226 are not necessarily symmetrical this may drive up manufacturing costs for routers 220, 222, 224, 226 while decreasing the reliability of at least one of the routers 220, 222, 224, 226. This discrepancy may be alleviated through standardization of all routers in a storage network, while still allowing the distribution of management information over the power lines.

Figure 5:
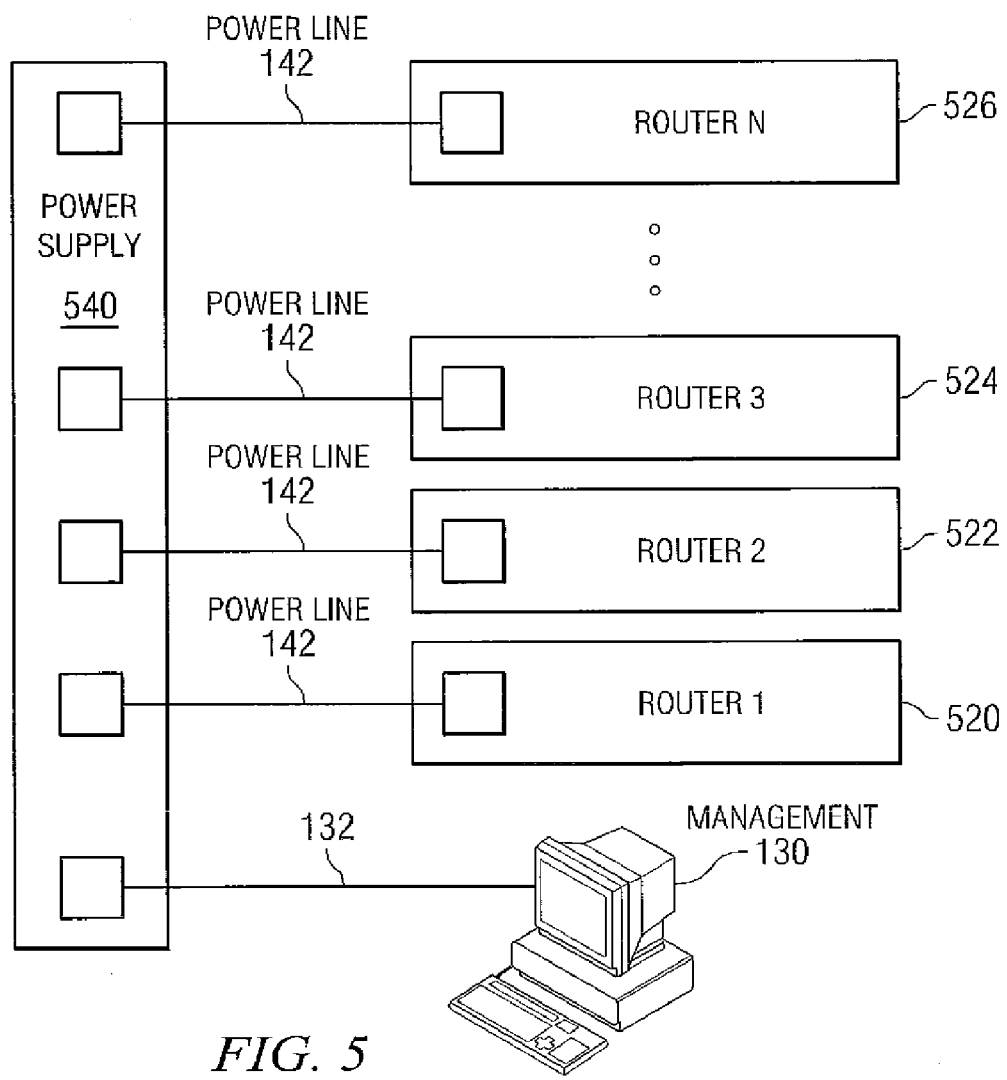
FIG. 5 depicts a block diagram of yet another embodiment of components of a storage system.

An embodiment of a system for distributing management information over the existing power media in a storage system which accomplishes this is depicted in FIG. 5. Routers 520, 522, 524, 526 are a series of storage routers which are part of a larger storage system designed to implement an integrated storage solution. As described above with respect to FIG. 3, each router 520, 522, 524, 526 has interfaces capable of receiving data and routing that data to another location (not shown) as described above. To manage routers 520, 522, 524, 526 in the storage system, management software executes on a separate computer system 130.

Management software on computer system 130 may wish to send a management communication to one of routers 520, 522, 524, 526. To accomplish this, computer system 130 sends the management communication to power supply 540, which in turn delivers this management communication to each of routers 520, 522, 524, 526 over power lines 142. Routers 520, 522, 524, 526 may each receive the management communication on power lines 142, make a determination whether the management communication is intended for itself, respond to the management communication if it is and discard the management communication if it is not.

Conversely, routers 520, 522, 524, 526 may wish to send a management communication to management system 130. To accomplish this, routers 520, 522, 524, 526 place the management communication on power lines 142 for delivery to power supply 540. Power supply 540 then delivers the management communication to management computer 130. In one embodiment, the management communication is delivered over ethernet cable 132.

Figure 6:
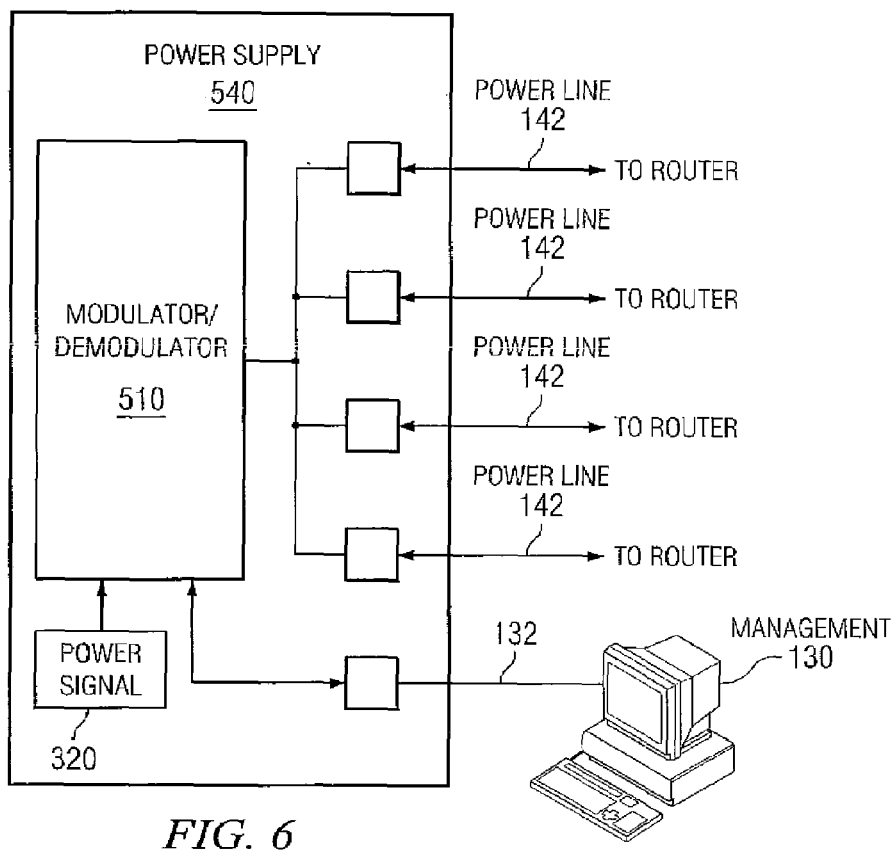
FIG. 6 depicts a block diagram of one embodiment of a power supply which may be used with the components depicted in FIG. 5.

A more detailed illustration of one embodiment of the power supply of FIG. 5 is depicted in FIG. 6. Power supply 540 receives a management communication from management system 130 over ethernet cable 132. Modulator/demodulator 510 then modulates the management communication onto power line 142 using a carrier frequency and power signal 320 on power line 142 as described above. Power line 142 couples power supply 540 to each of the routers 520, 522, 524, 526 providing both power and the management communication to each of routers 520, 522, 524, 526.

Figure 7:
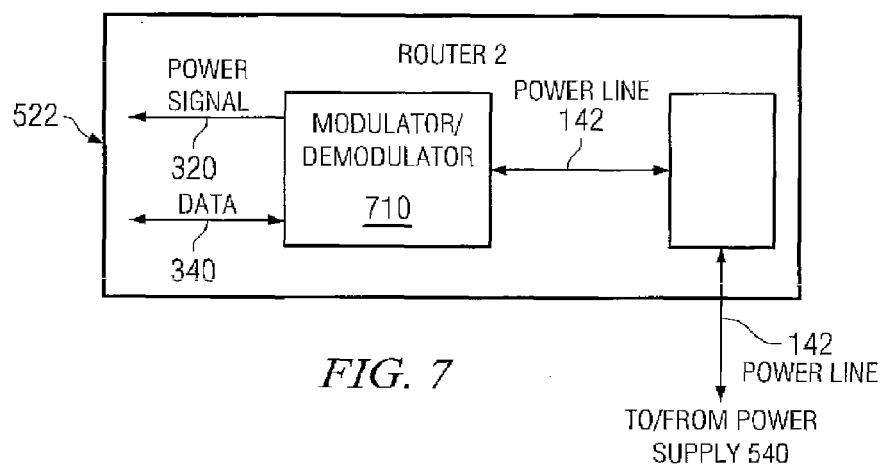
FIG. 7 depicts a block diagram of one embodiment of a router which may be used with the components depicted in FIG. 2.

Moving to FIG. 7, a more detailed block diagram of one embodiment of a router which may be coupled to the power supply of FIG. 6 is depicted. Router 522 receives power from power line 142. Additionally, modulator/demodulator 710 in router 522 may demodulate the signal received on power line 142 according to the methodology utilized to place a management communication on the line, as described above. This may produce a management communication placed on power line 142 by power supply 540. If a management communication is present on power line 142, router 522 analyzes the identification of the intended recipient of the management communication. If the management communication is intended for router 522, router 522 may evaluate the management communication and respond to the management communication accordingly. If, however, the communication is not intended for router 522, router 522 may ignore or discard the management communication. As depicted in FIG. 5, routers 520, 524 and 526 are also coupled to power line 142 and function in substantially the same manner as router 522 described above.

At some point, router 522 may wish to send a management communication to management system 130. To accomplish this, the management communication may be sent to modulator/demodulator 710 of router 522 along data line 340. Modulator/demodulator 710 then modulates the management communication onto power line 142, as described above with respect to FIG. 3, for eventual reception at power supply 540.

Returning now to FIG. 6, power supply 540 receives this management communication from router 522 on power line 142. Modulator/demodulator 510 of power supply 540 demodulates the signal received on power line 142 according to the methodology described above, to produce the original management communication sent by router 522. This management communication can then be delivered to management system 130 over ethernet cable 132.

Figure 8:
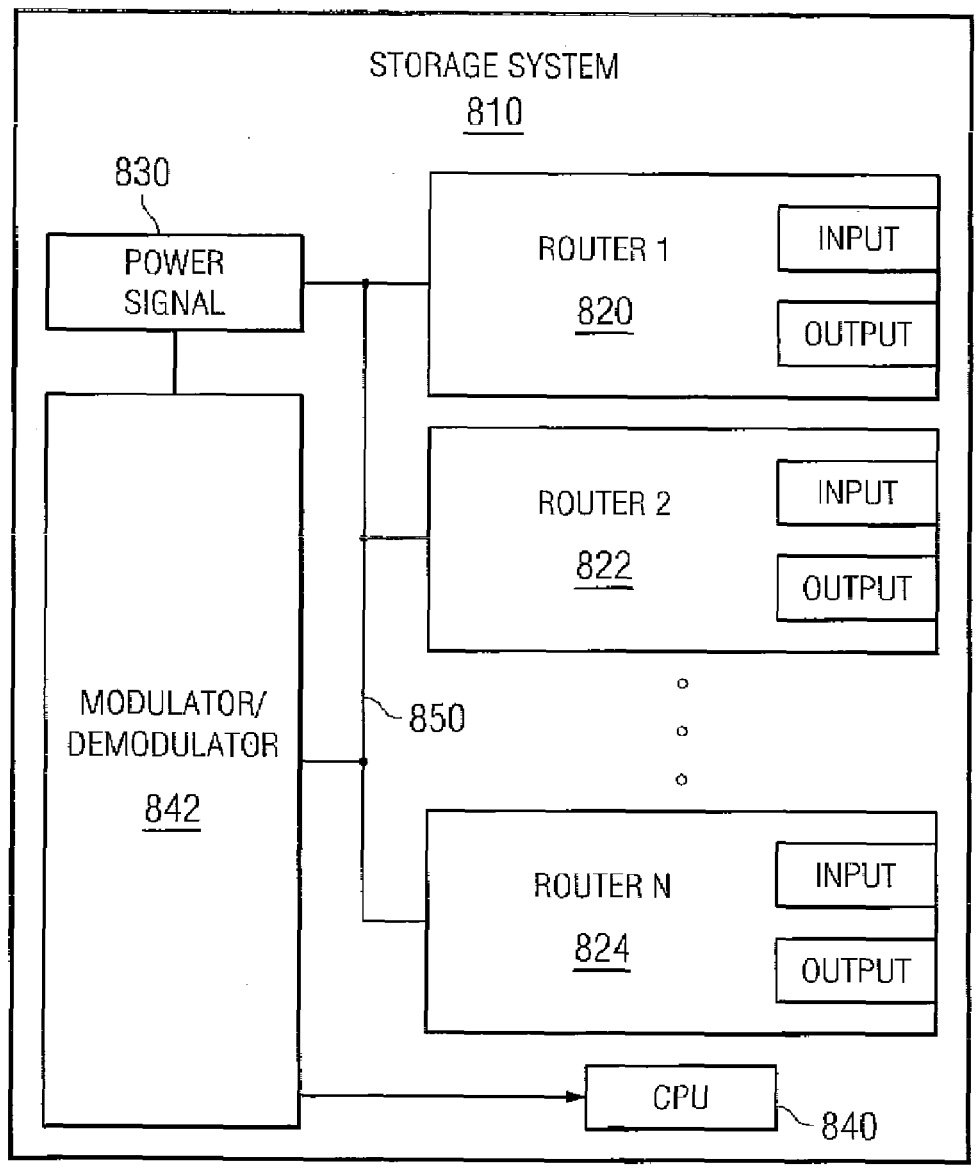
FIG. 8 depicts a block diagram of one embodiment of components of a storage system.

It will be apparent to those of skill in the art that the methodologies described above may be implemented in a variety of other settings. For example, FIG. 8 depicts one embodiment of a system for distributing management information over the power media in a storage system, where the power media is a backplane. Storage system 810 comprises a series of routers 820, 822, 824, each router 820, 822, 824 configured to receive input from one or more devices and route this input to one or more output devices. In some cases, input may be received on one physical medium and output on another physical medium. Routers 820, 822, 824 are connected to power bus 850 in a backplane of storage system 810, and receive power through the backplane from power bus 850.

In order to coordinate or manage routers 820, 822, 824, CPU 840 of storage system 810 may send a management communication intended for one or more of routers 820, 822, 824 to modulator/demodulator 842. Modulator/demodulator 842 modulates management communication onto power bus 850 of the backplane using a carrier frequency and power signal 830 as described above. The management communication can then travel to each of routers 822, 824, 826 on power bus 850.

A modulator/demodulator in each of routers 822, 824, 826 may demodulate the signal received on power bus 850 according to the methodology utilized to place a management communication on the line, as described above. This may produce a management communication placed on power bus 850 of the backplane. Each router 822, 824, 826 then analyzes the identification of the intended recipient of the management communication. If the management communication is intended for the respective router 822, 824, 826, router 822, 824, 826 may evaluate the management communication and respond to the management communication accordingly. If, however, the communication is not intended for router 822, 824, 826 the management communication may be ignored or discarded.

When routers 820, 822, 824 wish to send a management communication to CPU 840, routers 820, 822, 824 place the management communication on power bus 850. Modulator/demodulator 842 may demodulate the signal received on power bus 850 to produce the management communication. The management communication can then be delivered to CPU 840.

By delivering management communications on the backplane through power bus 850, as opposed to using a separate management bus on the backplane, the manufacturing costs of storage system 810 may be decreased while simultaneously increasing the reliability of the system.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for distributing management communications in a network, comprising:
   placing a management communication on a power line at a component; and
   receiving the management communication at a first routing device coupled to the power line, wherein the power line supplies power to the first routing device and the component is a second routing device operable to receive a management communication and place the management communication on the power line using the modulator.

2. The method of claim 1, wherein the first routing device and the second routing device are operable to communicate according to a first transport medium and the management communication is received by the second routing device on a second transport medium distinct from the first transport medium.

3. The method of claim 2, wherein the second transport medium is a management communication medium.

4. The method of claim 3, wherein the management communication medium is Ethernet.

5. The method of claim 1, wherein the component is a power supply.

6. The method of claim 5, wherein the power supply is operable to modulate the communication onto the power line and provide power to the first routing device on the power line.

7. A method for distributing management communications in a network, comprising:
   placing a management communication on a power line at a component; and
   receiving the management communication at a first routing device coupled to the power line, wherein the power line supplies power to the first routing device and the management communication was received at the power supply on a management communication medium.

8. The method of claim 7, wherein the management communication medium is Ethernet.

9. A method for distributing management communications in a network, comprising:
   placing a management communication on a power line at a component; and
   receiving the management communication at a first routing device coupled to the power line, wherein the power line supplies power to the first routing device and the management communication is related to administrative tasks associated with the network.

10. A method for distributing management communications in a network, comprising:
    placing a management communication on a power line at a component; and
    receiving the management communication at a first routing device coupled to the power line, wherein the power line supplies power to the first routing device and the management communication originated from a management program.

11. A network which utilizes management communications, comprising:
    a component operable to place a management communication on a power line; and a first routing device coupled to the component via the power line, operable to receive the management communication on the power line, wherein the power line supplies power to the first routing device and the component is a second routing device operable to receive a management communication and place the management communication on the power line using the modulator.

12. The network of claim 11, wherein the first routing device and the second routing device are operable to communicate according to a first transport medium and the management communication is received by the second routing device on a second transport medium distinct from the first transport medium.

13. The network of claim 12, wherein the second transport medium is a management communication medium.

14. The network of claim 13, wherein the management communication medium is Ethernet.

15. The network of claim 11, wherein the component is a power supply.

16. The network of claim 15, wherein the power supply is operable to modulate the communication onto the power line and provide power to the first routing device on the power line.

17. A network which utilizes management communications, comprising:
    a component operable to place a management communication on a power line; and a first routing device coupled to the component via the power line, operable to receive the management communication on the power line, wherein the power line supplies power to the first routing device and the management communication was received at the power supply on a management communication medium.

18. The network of claim 17, wherein the management communication medium is Ethernet.

19. A network which utilizes management communications, comprising:
    a component operable to place a management communication on a power line; and a first routing device coupled to the component via the power line, operable to receive the management communication on the power line, wherein the power line supplies power to the first routing device and the management communication is related to administrative tasks associated with the network.

20. A network which utilizes management communications, comprising:
    a component operable to place a management communication on a power line; and a first routing device coupled to the component via the power line, operable to receive the management communication on the power line, wherein the power line supplies power to the first routing device and the management communication originated from a management program.

21. A method for distributing management communications in a storage system, comprising:
    placing a management communication on a power line at a first routing device using a modulator;
    receiving the management communication at a component on the power line; and
    communicating the management communication to a management program, where communicating the management communication to the management program comprises placing the management communication a management communication medium.

22. The method of claim 21, wherein the management communication medium is distinct from the power line.

23. The method of claim 21, wherein the management communication medium is Ethernet.

24. The method of claim 23, wherein the component is a power supply.

25. The method of claim 23, wherein the component is a second routing device, wherein the power line supplies power to the second routing device.

* * * * *

US007453348C1

(12) EX PARTE REEXAMINATION CERTIFICATE (10859th)
United States Patent
Schlinger

(10) Number: US 7,453,348 C1
(45) Certificate Issued: Apr. 29, 2016

(54) METHOD AND SYSTEM FOR DISTRIBUTING MANAGEMENT INFORMATION OVER POWER NETWORKS

(75) Inventor: Bryan Schlinger, Georgetown, TX (US)

(73) Assignee: CF DB EZ LLC, New York, NY (US)

Reexamination Request:
No. 90/013,572, Aug. 28, 2015

Reexamination Certificate for:
Patent No.: 7,453,348
Issued: Nov. 18, 2008
Appl. No.: 11/820,265
Filed: Jun. 18, 2007

Related U.S. Application Data

(63) Continuation of application No. 11/043,327, filed on Jan. 26, 2005, now Pat. No. 7,327,223.

(51) Int. Cl.
*G05B 11/01* (2006.01)
*H04B 3/40* (2006.01)
*H04L 12/24* (2006.01)

(52) U.S. Cl.
CPC . *H04B 3/40* (2013.01); *H04L 41/04* (2013.01)

(58) Field of Classification Search
None
See application file for complete search history.

(56) References Cited

To view the complete listing of prior art documents cited during the proceeding for Reexamination Control Number 90/013,572, please refer to the USPTO's public Patent Application Information Retrieval (PAIR) system under the Display References tab.

*Primary Examiner* — Jalatee Worjloh

(57) ABSTRACT

Systems and methods for distributing management information in a computing system over existing power are disclosed. Embodiments of these systems and methods may eliminate the need for a separate physical network to distribute management information in the computer system and the commensurate physical hardware need to implement these networks. More particularly, embodiments may provide a management system which may place a management communication on a physical transport medium. This management communication may then be placed on the power lines used to power the various components of the computing system and distributed to the various components along these power lines, where it may be received by its intended recipient and acted upon if necessary.

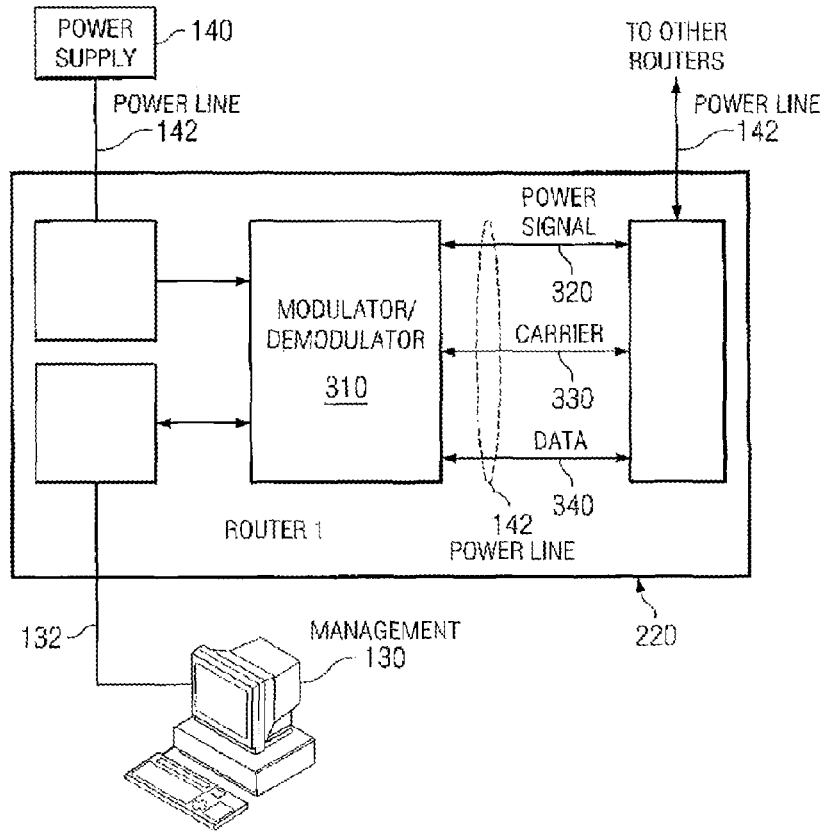

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 21-25 is confirmed.

Claims 1, 2, 7, 9-11, 17, 19 and 20 are determined to be patentable as amended.

Claims 3-6, 8, 12-16 and 18, dependent on an amended claim, are determined to be patentable.

1. A method for distributing management communications in a network, comprising:
   placing a *first* management communication on a power line at a component; [and]
   receiving the *first* management communication at a first routing device coupled to the power line, wherein the power line supplies power to the first routing device and the component is a second routing device operable to receive a management communication and place the management communication on the power line using the modulator;
   *receiving a second management communication from the first routing device at the component on the power line; and*
   *communicating the second management communication from the component to a management program.*

2. The method of claim 1, wherein the first routing device and the second routing device are operable to communicate according to a first transport medium and the *first* management communication is received by the second routing device on a second transport medium distinct from the first transport medium.

7. A method for distributing management communications in a network, comprising:
   placing a *first* management communication on a power line at a component; [and]
   receiving the *first* management communication at a first routing device coupled to the power line, wherein the power line supplies power to the first routing device and the *first* management communication was received at the power supply on a management communication medium;
   *receiving a second management communication at the component on the power line, wherein the second management communication was received from the first routing device coupled to the power line; and*
   *communicating the second management communication from the component to a management program.*

9. A method for distributing management communications in a network, comprising:
   placing a *first* management communication on a power line at a component; [and]
   receiving the *first* management communication at a first routing device coupled to the power line, wherein the power line supplies power to the first routing device and the *first* management communication is related to administrative tasks associated with the network;
   *receiving a second management communication at the component on the power line, wherein the second management communication was received from the first routing device coupled to the power line; and*
   *communicating the second management communication from the component to a management program.*

10. A method for distributing management communications in a network, comprising:
    placing a *first* management communication on a power line at a component; [and]
    receiving the *first* management communication at a first routing device coupled to the power line, wherein the power line supplies power to the first routing device and the *first* management communication originated from a management program;
    *receiving a second management communication at the component on the power line, wherein the second management communication was received from the first routing device coupled to the power line; and*
    *communicating the second management communication from the component to the management program.*

11. A network which utilizes management communications, comprising:
    a component operable to place a *first* management communication on a power line, *receive a second management communication on the power line, and communicate the second management communication to a management program*; and a first routing device coupled to the component via the power line, operable to receive the *first* management communication on the power line *and place the second management communication on the power line*, wherein the power line supplies power to the first routing device and the component is a second routing device operable to receive a management communication and place the management communication on the power line using the modulator.

17. A network which utilizes management communications, comprising:
    a component operable to place a *first* management communication on a power line, *receive a second management communication on the power line, and communicate the second management communication to a management program*; and a first routing device coupled to the component via the power line, operable to receive the *first* management communication on the power line *and place the second management communication on the power line*, wherein the power line supplies power to the first routing device and the *first* management communication was received at the power supply on a management communication medium.

19. A network which utilizes management communications, comprising:
    a component operable to place a *first* management communication on a power line, *receive a second management communication on the power line, and communicate the second management communication to a management program*; and a first routing device coupled to the component via the power line, operable to receive the *first* management communication on the power line *and place the second management communication on the power line*, wherein the power line supplies power to the first routing device and the *first* management communication is related to administrative tasks associated with the network.

20. A network which utilizes management communications, comprising:

a component operable to place a *first* management communication on a power line, *receive a second management communication on the power line, and communicate the second management communication to a management program*; and a first routing device coupled to the component via the power line, operable to receive the *first* management communication on the power line *and place the second management communication on the power line*, wherein the power line supplies power to the first routing device and the *first* management communication originated from [a] *the* management program.

\* \* \* \* \*